(12) United States Patent
Lim (10) Patent No.: US 9,253,774 B2
(45) Date of Patent: Feb. 2, 2016

(54) SCHEDULING METHOD IN A SHORT DISTANCE WIRELESS PERSONAL AREA NETWORK

(75) Inventor: Jaewon Lim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 126 days.

(21) Appl. No.: 14/117,670

(22) PCT Filed: Nov. 17, 2011

(86) PCT No.: PCT/KR2011/008796
§ 371 (c)(1),
(2), (4) Date: Nov. 14, 2013

(87) PCT Pub. No.: WO2012/165732
PCT Pub. Date: Dec. 6, 2012

(65) Prior Publication Data
US 2014/0086204 A1    Mar. 27, 2014

Related U.S. Application Data (60) Provisional application No. 61/492,764, filed on Jun. 2, 2011.

(51) Int. Cl.
| | | |
|---|---|---|
| *H04W 72/04* | (2009.01) | |
| *H04W 74/02* | (2009.01) | |
| *H04W 84/18* | (2009.01) | |
| *H04W 4/00* | (2009.01) | |

(52) U.S. Cl.
CPC ........ *H04W 72/0446* (2013.01); *H04W 72/048* (2013.01); *H04W 72/0453* (2013.01); *H04W 74/02* (2013.01); *H04W 4/008* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2009/0257410 A1* | 10/2009 | Liu | ................................ 370/336 |
| 2011/0085522 A1 | 4/2011 | Park et al. | |
| 2011/0158206 A1* | 6/2011 | Shrestha et al. | ............... 370/336 |

FOREIGN PATENT DOCUMENTS

| | | |
|---|---|---|
| KR | 10-0742776 B1 | 7/2007 |
| KR | 10-2011-0039859 A | 4/2011 |
| KR | 10-2011-0040638 A | 4/2011 |

OTHER PUBLICATIONS

Written Opinion and International Search Report issued in corresponding International Patent Application No. PCT/KR2011/008796 dated Jul. 30, 2012.

International Search Report issued in corresponding International Patent Application No. PCT/KR2011/008796 dated Jul. 30, 2012.

* cited by examiner

*Primary Examiner* — Marcus R Smith
*Assistant Examiner* — Lakeram Jangbahadur
(74) *Attorney, Agent, or Firm* — Morgan, Lewis & Bockius LLP (57) ABSTRACT

The present invention relates to a method of allocating a transmission band to a terminal in a Wireless Personal Area Network (WPAN). The method includes: determining an allocation period of a transmission band on the basis of characteristic information that a terminal has; transmitting a transmission band request to a WPAN coordinator; and receiving information relating to the transmission band allocation from the WPAN coordinator. The transmission band request includes the allocation period of the transmission band determined by the terminal; and the transmission band allocation is determined based on the transmission band allocation period determined by the terminal.

18 Claims, 10 Drawing Sheets

SCHEDULING METHOD IN A SHORT DISTANCE WIRELESS PERSONAL AREA NETWORK

FIELD OF THE INVENTION

The present invention relates to a method of a user equipment for being allocated with a transmission band in a WPAN (wireless personal area network) and an apparatus for the same and, more particularly, to a method for being allocated with a transmission band based upon characteristics of a user equipment and an apparatus for the same.

BACKGROUND ART

The IEEE 802.15.4 WPAN (wireless personal area network) standard is defined with respect to a close range (or short distance) communication technology for providing convenience in the interconnection between personal mobile devices (or user equipments).

In the 868/915 MHz band, the IEEE 802.15.4 standard uses BPSK (binary phase-shift keying) so as to provide transmission rates of 20 Kbps and 40 Kbps, and, in the 2.45 GHz band, the IEEE 802.15.4 standard uses O-QPSK (offset quadrature phase-shift keying) so as to provide a transmission rate of 250 Kbps.

Figure 1:
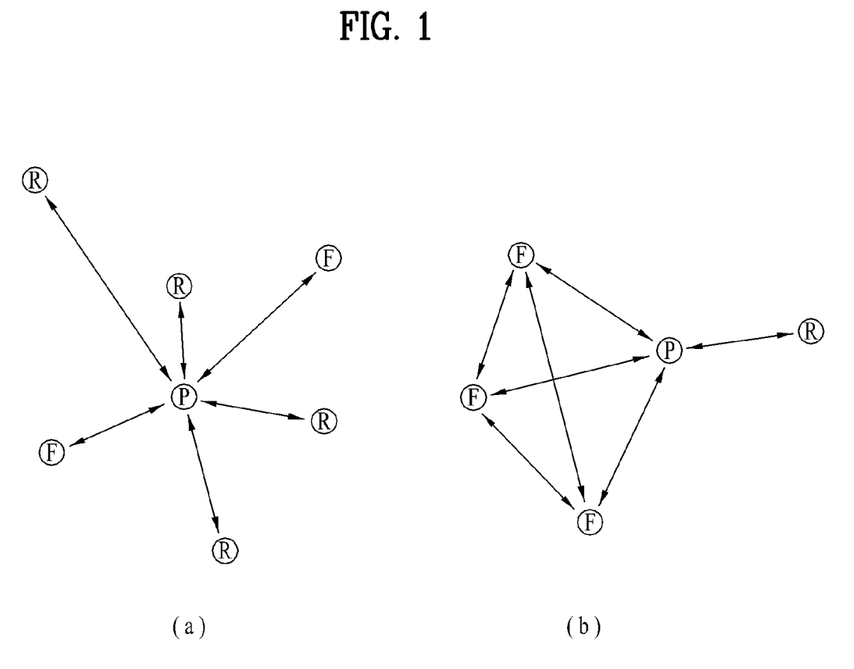
FIG. 1 illustrates an exemplary Network Topology based upon IEEE 802.15.4.

FIG. 1 illustrates an exemplary Network Topology based upon IEEE 802.15.4.

In the IEEE 802.15.4 network, two different types of devices, such as FFD (Full Function Device) and RFD (Reduced Function Device), may be involved. The FFD performs functions, such as network initialization, node management, node information storage, and so on, and, herein, the FFD is also referred to as a PAN coordinator (Personal Area Network coordinator), so that the remaining devices can configure any one of the respective networks.

As a device that can perform coordinator functions, the FFD may configure diverse forms (or types) of network topology, and the FFD may perform communication with both FFDs and RFDs. Moreover, since the FFD consumes a relatively larger amount of power in order to perform the coordinator functions, the FFD is generally supplied with power via wired connection.

Conversely, as a device that cannot perform the functions of a coordinator, the RFD becomes the coordinating target of the FFD. More specifically, the RFD may perform communication only with the FFD, and, by assigning the FFD with all network functions, the RFD may use only a minimum stack structure size, thereby being capable of saving (or economizing) operation (or calculation)/memory resource. Accordingly, after locating the PAN coordinator and transmitting data, since the RFD may immediately disconnect its connection, so as to enter (or shift to) a Save (Sleep) mode, the consumed amount of power becomes very small, thereby allowing the RFD to operate on battery power for a long period of time.

Referring to FIG. 1, a device being indicated as "F" represents the FFD, a device being indicated as "R" represents the RFD, and a device being indicated as "P" represents an FFD performing the roles of a coordinator.

FIG. 1 shows two different types of network topology that can be configured by the IEEE 802.15.4 system. Herein, (a) of FIG. 1 shows an example of a star type network (or star topology), and (b) of FIG. 1 shows an example of a Peer to Peer type network (or Peer to Peer topology).

In the star topology, only the communication between the device and the PAN coordinator may be established. At this point, the devices may correspond to a starting point or an ending point of the communication, whereas the PAN coordinator may correspond to a starting point, an ending point, or a router.

In the peer-to-peer topology, each device may perform communication with any one of the devices existing in the network. Therefore, a network having a more complicated structure, such as a mesh network, may be configured.

The star network may operate the devices so that the durability of the battery may be maintained for a long period of time, and, since the Peer to Peer network may configure at least one or more data delivery paths, the Peer to Peer network may have higher data reliability and higher access recognition rate.

Figure 2:
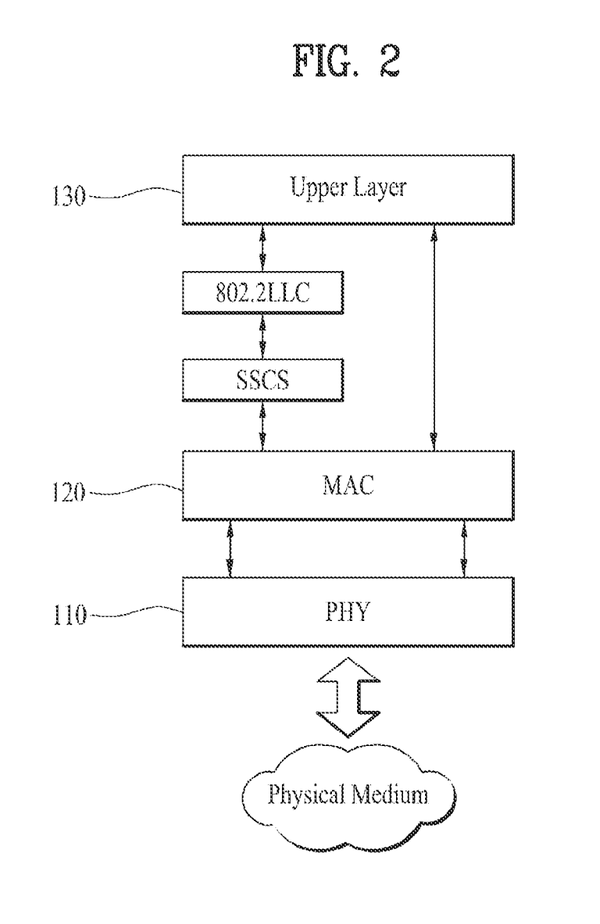
FIG. 2 illustrates a structural view of a protocol stack in an IEEE 802.15.4 system.

FIG. 2 illustrates a structural view of a protocol stack in an IEEE 802.15.4 system.

As it can be known with reference to FIG. 2, the IEEE 802.15.4 protocol stack may consist of a PHY layer (Physical layer) (110), a MAC layer (Medium Access Control layer) (120), and an Upper layer (130).

The PHY layer (110) includes an RF transceiver (or transmitter/receiver) and a related control mechanism, the MAC layer (120) provides access to a physical channel for data transmission.

The Upper Layer (130) is configured of a Network Layer and an Application Layer. The network layer provides functions, such as network configuration, processing, message routing, and so on. The application layer provides the functions targeted by the device. For example, depending upon the type of the program installed therein. i.e., depending upon the type of the program processing the data of the application layer, an IEEE 802.15.4 device (100) may perform as an RFD (Reduced Function Device), an FFD (Full Function Device), or a coordinator.

Figure 3:
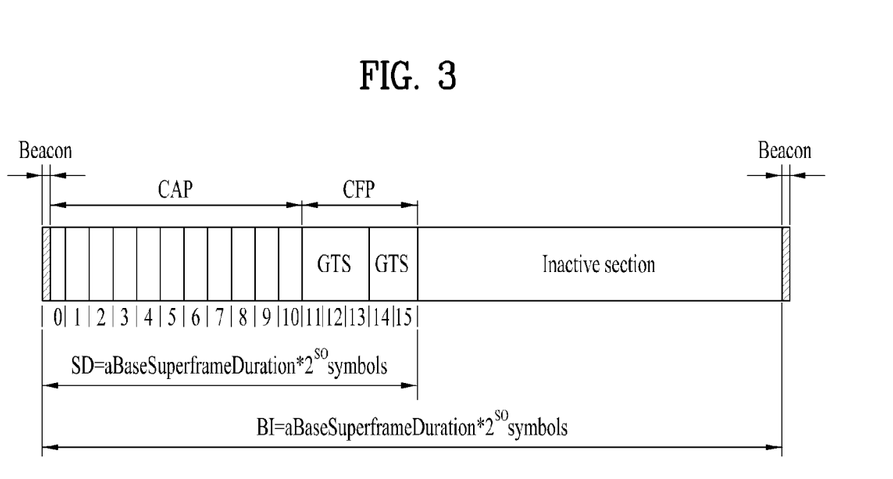
FIG. 3 illustrates a structure of a super frame being used in the IEEE 802.15.4 system.

FIG. 3 illustrates a structure of a super frame being used in the IEEE 802.15.4 system.

In accordance with its low power request, the IEEE 802.15.4 system is configured of an active period and an inactive period. And, the repetition cycle of the active period and the inactive period is referred to as a duty cycle.

The active period is configured of a Beacon, a CAP (Contention Access Period), and CFP (Contention Free Period), and data transmission occurs during the CAP period.

The CFP period is configured of multiple GTSs (Guaranteed Time Slots), and each GTS is allocated to a specific device, so that each device may use the allocated GTS for transmitting and receiving data to and from the PAN coordinator. The GTS may support one PAN and up to a maximum of 7 PANs.

The allocated content of each GTS is determined (or set up) in the form of a GTS descriptor by the PAN coordinator. The GTS descriptors are included in the GTS field of the beacon and are transmitted by the PAN coordinator.

In the GTS allocation method of the conventional IEEE 802.15.4 system, once a device is allocated with a GTS, the corresponding device is continuously allocated with a GTS for each super frame until de-allocation of the GTS is performed upon request of the device or due to a GTS expiration.

However, in this method, since the required GTS may differ for each GTS, this method is inefficient. This is because once a device is allocated with a GTS, no other device can be allocated with the corresponding GTS until the corresponding GTS is de-allocated.

Therefore, a method allowing a GTS to be allocated to each device at different cycle periods and allowing the device to use the GTS by using a time-division method is being required.

DETAILED DESCRIPTION OF THE INVENTION

Technical Objects

Accordingly, an object of the description of the present invention is to propose an efficient allocation method of a transmission band (e.g., GTS) in an IEEE 802.15.4 system. Additionally, another object of the description of the present invention is to provide a device that can perform the above-described method.

Technical Solutions

In order to achieve the above-described object, according to a disclosure of the specification of the present invention, provided herein is a method of a device for being allocated with a transmission band in a WPAN (Wireless Personal Area Network) system, which may include the steps of deciding an allocation interval of the transmission band based upon characteristics information included in a device; transmitting a transmission band request to a WPAN coordinator; and receiving information related to the transmission band allocation from the WPAN coordinator. The transmission band request may include a transmission band allocation interval decided by the device; and the transmission band allocation may be decided based upon a transmission band allocation interval decided by the device.

The transmission band request may request for a transmission band to be allocated from a CFP (contention free period).

The method may further include a step of transmitting data from a CAP (Contention Access Period), if the transmission band is not allocated from the CFP.

The characteristics information may correspond to information acquired from data that are to be transmitted, or the characteristics information may correspond to information acquired from characteristics of the device itself.

The transmission band may correspond to a GTS (guaranteed time slot).

The allocation interval of the transmission band decided by the device may be decided in super frame units.

The allocation interval of the transmission band decided by the device may be decided in time units.

The allocation interval of the transmission band decided by the device may be transmitted by being included in a GTS characteristic field within the transmission band request.

The GTS characteristic field may further include a GTS interval field, and the GTS interval field may include an allocation interval of the transmission band decided by the device.

The information related to the transmission band allocation is received by being included in a GTS list field within a beacon, the beacon being transmitted by the WPAN coordinator.

The GTS list field may further include a Start Sequence Number field and a GTS interval field, the Start Sequence Number field may include a sequence number of a super frame, from which a transmission band starts to be allocated to the device, and the GTS interval field may include an interval of a transmission band allocated to the device.

In order to achieve the above-described object, according to another disclosure of the specification of the present invention, provided herein is a device of a WPAN (Wireless Personal Area Network) system, which may include a controller deciding an allocation interval of the transmission band based upon characteristics information included in a device, transmitting a transmission band request to a WPAN coordinator, receiving information related to the transmission band allocation from the WPAN coordinator; and a wireless communication unit transmitting/receiving data to/from the WPAN coordinator by using the decided transmission band, in accordance with the control of the controller.

The transmission band request may request for a transmission band to be allocated from a CFP (contention free period).

The controller may further include a control process of transmitting data from a CAP (Contention Access Period), if the transmission band is not allocated from the CFP.

The characteristics information may correspond to information acquired from data that are to be transmitted, or the characteristics information may correspond to information acquired from characteristics of the device itself.

The transmission band may correspond to a GTS (guaranteed time slot).

The controller may decide the allocation interval of the transmission band in super frame units.

The controller may decide the allocation interval of the transmission band in time units.

The controller may transmit the GTS allocation interval by including the GTS allocation interval in a GTS characteristic field within a transmission band request.

The GTS characteristic field may further include a GTS interval field, and the GTS interval field may include an allocation interval of the transmission band decided by the device.

Effects of the Invention

According to the exemplary embodiment of the present invention, a limited transmission band may be efficiently distributed to multiple devices in the IEEE 802.15.4 system. Additionally, the present invention is advantageous in that the power consumption of the user equipment (or device) operating in the IEEE 802.15.4 system can be reduced.

MODE FOR CARRYING OUT THE PRESENT INVENTION

The technical terms used in this specification are merely used to describe specific embodiments of the present invention. Therefore, it should be understood that the terms used herein are not intended to limit the present invention. Additionally, unless defined otherwise, the technical terms used in this specification should be interpreted by the meaning and significance generally known to and understood by anyone skilled in the art and, therefore, should not be interpreted as an excessively broad and inclusive meaning nor interpreted as an excessively narrow meaning. Moreover, in case any of the technical terms used in the specification of the present invention corresponds to an incorrect term that is incapable of correctly express the scope and spirit of the present invention, the corresponding term should be replaced by a correct technical term that can be correctly understood by anyone skilled in the art. Furthermore, the general terms used in the specification of the present invention should be understood by its literal meaning defined in a dictionary, or should be interpreted based upon the overall context of a phrase, sentence, or paragraph of the specification. And, therefore, such general terms should not be understood or interpreted by excessively narrow meanings.

Additionally, it is to be understood that, unless obviously and clearly noted or specified otherwise within the specification, singular forms of the terms used herein may include plural forms of the corresponding terms. In the application of the present invention, the terms "consist(s) of" or "include(s) (or comprise(s))" should not be interpreted or understood as including, without exception, all of the plurality of elements (or components) or the plurality of steps disclosed in the description of the present invention. In other words, it should be understood that some (or part) of the elements (or components) or some (or part) of the steps may not be included, or that additional elements (or components) or steps may be further included in the present invention.

Additionally, the suffixes "module" and "unit" that are mentioned in the elements used in the present description are merely used individually or in combination for the purpose of simplifying the description of the present invention. Therefore, the suffix itself will not be used to differentiate the significance or function or the corresponding term.

Furthermore, terms including numeric expressions, such as first ($1^{st}$), second ($2^{nd}$), and so on, used in the specification of the present invention may be used to described diverse elements of the present invention. However, the elements of the present invention should not be limited by the terms used in the specification of the present invention. In other words, such terms will be used only to differentiate one element from other elements of the present invention. For example, without deviating from the scope and spirit of the present invention, a first element may be referred to as a second element, and, similarly, a second element may also be referred to as a first element.

Hereinafter, the preferred embodiments of the present invention will be described in detail with reference to the accompanying drawings. However, regardless of the reference numerals within the drawings, the same reference numerals will be given to like or same part of the present invention, and detailed description of the same parts will be omitted for simplicity.

Also, in describing the present invention, if it is determined that detailed description of a disclosed technology may cause ambiguity in describing the principle of the present invention, the detailed description of the same will also be omitted for simplicity. Furthermore, it will be apparent that the appended drawings are merely provided to facilitate the understanding of the scope and spirit of the present invention, and that the appended drawings are not provided to limit the scope and spirit of the present invention. Therefore, it should be understood that the scope and spirit of the present invention can be extended to all variations, equivalents, and replacements in addition to the appended drawings of the present invention.

Figure 4:
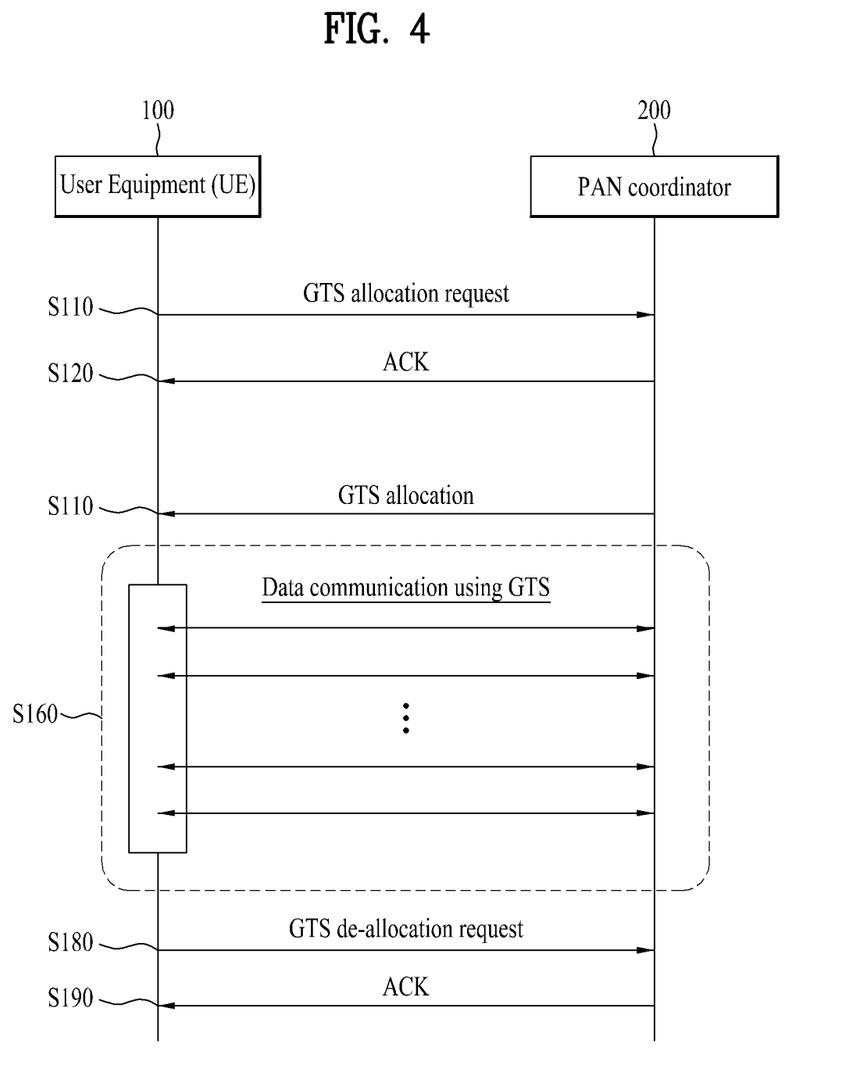
FIG. 4 illustrates a flow chart of GTS allocation and de-allocation (or recovery) procedures of the IEEE 802.15.4 system.

FIG. 4 illustrates a flow chart of GTS allocation and de-allocation (or recovery) procedures of the IEEE 802.15.4 system.

In the WPAN system, a predetermined transmission bandwidth should be allocated (or assigned) in order to perform data transception (or transmission/reception) through an exclusive (or closed) band allocation (or assignment) between a specific device and the coordinator, and, in the IEEE 802.15.4, the GTS (guaranteed time slot) is defined as the transmission band. Hereinafter, a detailed description will be given based upon the allocation of the GTS.

In case a device (or terminal) (100) includes data that are to be transmitted to a WPAN coordinator (200), the device (100) requests for a GTS allocation (S110) by transmitting a GTS request command including a parameter for the required GTS to the WPAN coordinator (200). At this point, a Characteristics Type within a GTS Characteristics field, which is included in the GTS request command, is set to 1, so as to indicate that the transmitted command corresponds to a GTS allocation request.

After deciding the GTS allocation respective to the device (100), the WPAN coordinator (200), once the device (or terminal) (100) decides to allocate the GTS, the device (100) transmits an ACK (Acknowledgment) to the device (100) (S120). Thereafter, the WPAN coordinator (200) transmits a beacon including information on the allocated GTS (GTS descriptor) (S140), so as to allow the device (100) receiving the beacon to use the GTS in accordance with the respective information.

The device (100) uses the allocated GTS, so as to transceive (or transmit/receive) data to/from the WPAN coordinator (200) (S160).

When the GTS is no longer necessary, the device (100) transmits a GTS de-allocation request command (GTS request command) to the WPAN coordinator (200) (S180). At this point, a Characteristics Type within a GTS Characteristics field, which is included in the GTS de-allocation request command, is set to 0, so as to indicate that the transmitted command corresponds to a GTS de-allocation request. After receiving the GTS de-allocation request from the device (100), the WPAN coordinator (200) de-allocates (or recovers) the GTS that was allocated to the device (100) and transmits an ACK to the device (100) (S190).

Figure 5:
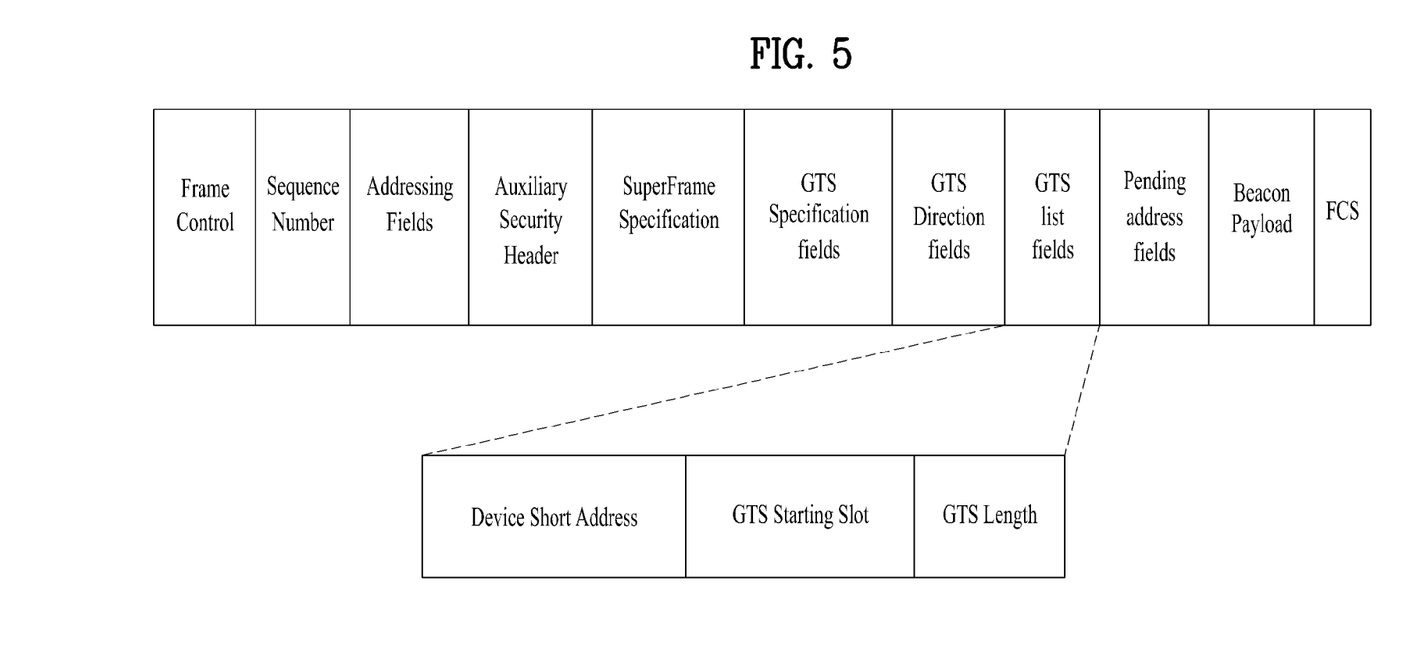
FIG. 5 illustrates structures of a beacon frame and a GTS descriptor being used in the IEEE 802.15.4 system.

FIG. 5 illustrates structures of a beacon frame and a GTS descriptor being used in the IEEE 802.15.4 system.

The content of each field included in the beacon frame follows the respective content defined in the IEEE 802.15.4. Most particularly, the allocation content respective to each GTS is configured by the WPAN coordinator to have a GTS descriptor format. The GTS descriptors are included in a GTS list of the beacon.

A Device Short Address sub field indicates a short address having the length of 16 bits respective to the device designated by the GTS descriptor. A GTS Start Slot sub field corresponds to a 4-bit field, which indicates the number of a slot from which the corresponding GTS starts. A GTS Length sub field corresponds to 4-bit field, which indicates the number of slots configuring the corresponding GTS.

Figure 6:
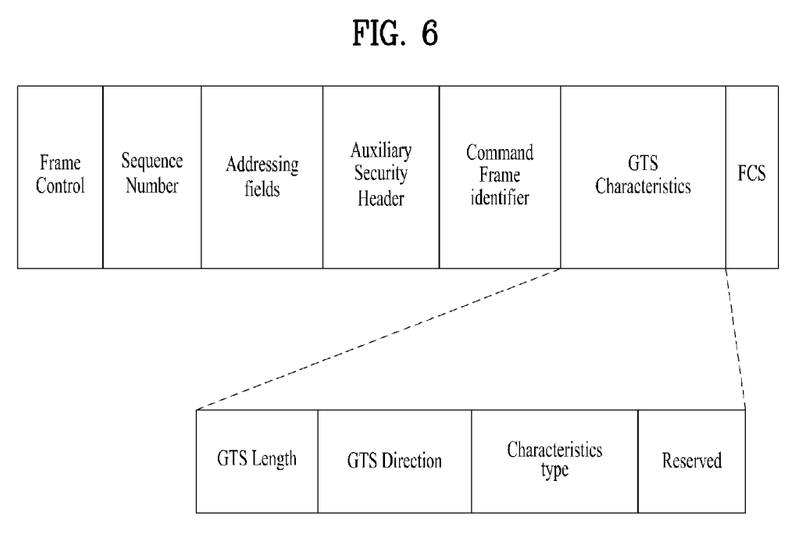
FIG. 6 illustrates a structure of a GTS request command being used in the IEEE 802.15.4 system.

FIG. 6 illustrates a structure of a GTS request command being used in the IEEE 802.15.4 system.

A GTS request command includes a GTS characteristics field, and the GTS request command delivers the nature (or attribute) and characteristics of the requested GTS to the WPAN coordinator.

The GTS Characteristics field includes GTS Length, GTS Direction, and Characteristics Type sub fields. The GTS Length sub field indicates a number of super frame slots with which the corresponding GTS should be configured. The GTS Direction sub field indicates whether the corresponding GTS is used by the device for a receiving purpose or for a transmitting purpose. The Characteristics Type sub field indicates whether the corresponding GTS request command is being used for GTS allocation or whether the corresponding GTS request command is being used for GTS de-allocation.

Figure 7:
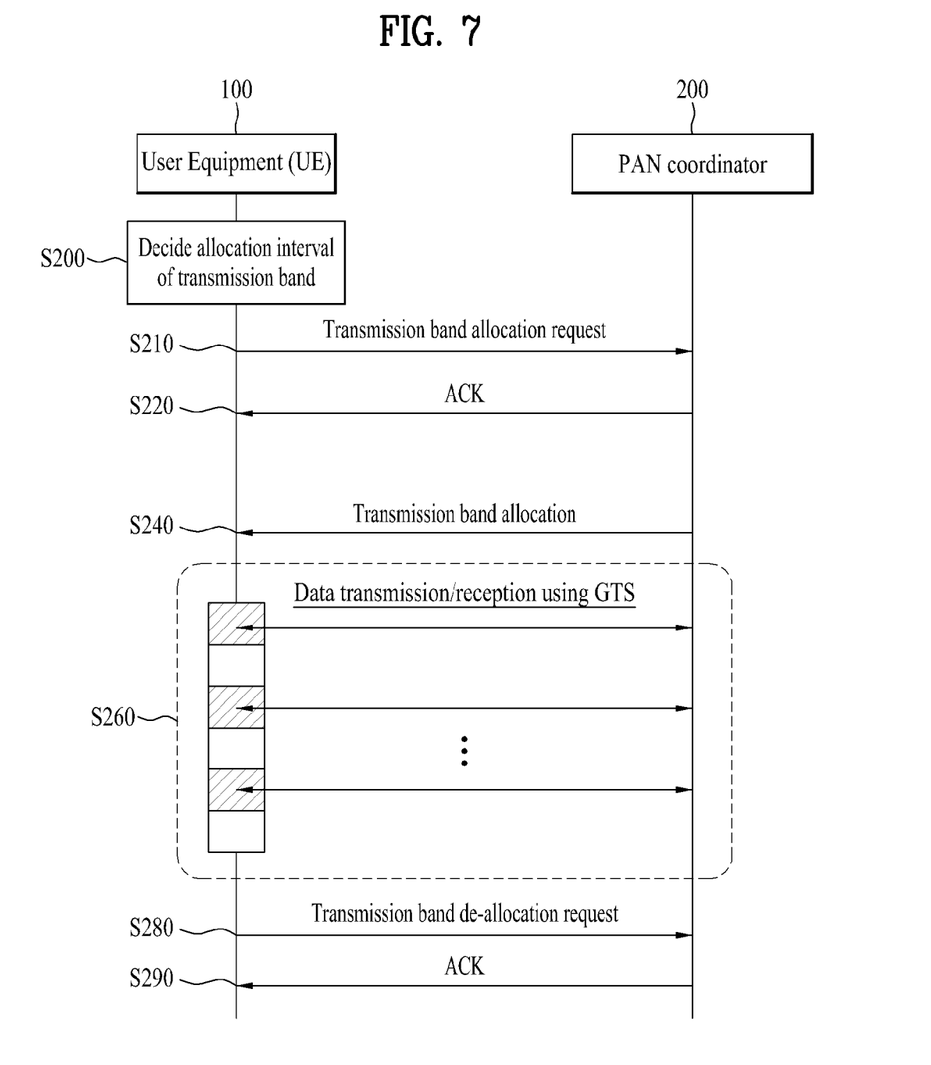
FIG. 7 illustrates a flow chart showing a method for allocating a transmission band according to an exemplary embodiment of the present invention.

FIG. 7 illustrates a flow chart showing a method for allocating a transmission band according to an exemplary embodiment of the present invention.

In case the device (100) has data that are to be transmitted to the WPAN coordinator (200), the device (100) may request for the allocation of a transmission band that is required for transceiving (or transmitting/receiving) data. An example of the transmission band may correspond to a Guaranteed Time Slot (GTS).

In case of requesting for the allocation of a transmission band, the device (100) may decide the allocation interval (or period) of the transmission band based upon its own characteristics information (S200). The characteristics information may correspond to information that is acquired from the data that are to be transmitted or may correspond to information that is acquired from the characteristics of the device itself. For example, information on the total amount of the data that are to be transmitted, information on whether or not the data correspond to data that are to be periodically transmitted, information on the usage of the device, and so on may correspond to the characteristics information. When the device decides the allocation period (or interval) of the transmission band, the device may carry out the decision-making process in super frame units or in predetermined time units. More specifically, the device may decide the allocation interval (or period) by using methods, such as "1 transmission band per 3 super frames" or "1 transmission band per 20 ms", and so on, based upon the characteristics information.

Thereafter, the device (100) may transmit the transmission band request, which includes the allocation interval (or period) of the decided transmission band, to the WPAN coordinator (200) (S210). For example, in case of requesting for the allocation of the GTS, the device transmits a GTS request command to the WPAN coordinator (200).

The transmission band request may include information on a required (or necessary) transmission band and allocation interval decided by the device. At this point, the transmission band request may correspond to GTS request command frame defined in the IEEE 802.15.4. The allocation interval of the transmission band may be included in a GTS Characteristics field within the GTS request command. The GTS Characteristics field may further include a GTS interval field, and the GTS interval field may include an allocation period of the transmission band decided by the device (100).

After receiving the transmission band request from the device (100), the WPAN coordinator (200) transmits an ACK (Acknowledgement) so as to notify the device (100) of an authorization (or confirmation) of the transmission band allocation (S220). Alternatively, if there is no authorization (or confirmation) to be allocated to the device (100), the WPAN coordinator (200) may also transmit a notification indicating that a transmission band cannot be allocated. In case of allocating a transmission band to the device (100), the WPAN coordinator (200) may allocate the transmission band based upon the allocation interval of the transmission band, which is included in the received transmission band request. At this point, the allocation may be performed as requested by the device, or the allocation may be performed differently from what is requested by the device based upon resource situation (or status), communication situation with other devices, and so on. For example, the device may have initially requested for "1 transmission band per 2 super frames", if the number of available transmission bands is insufficient, "1 transmission band per 4 super frames" may be allocated.

The WPAN coordinator (200) may transmit the information related to the allocation of the transmission band to the device (S240). The information related to the allocation of the transmission band may correspond to the allocation interval of the transmission band, which is decided by the WPAN coordinator (200), a starting point or ending point of the transmission band, and so on.

The WPAN coordinator (200) may transmit the information related to the allocation to the device (100) through a beacon, which is defined in the IEEE 802.15.4, and the information related to the allocation of the transmission band may be included in the GTS list field within the beacon. At this point, the GTS list field may further include a Start Sequence Number field and a GTS interval field. The Start Sequence Number field may include a sequence number of a super frame from which the transmission band begins to be allocated to the device, and the GTS interval field may include an interval of the transmission band, which is allocated to the device.

The device (100) may transceive (or transmit/receive) data to and from the WPAN coordinator (200) through the allocated transmission band (S260).

In case the transception (or transmission/reception) of the data is completed, the device may transmit a transmission band de-allocation request (S280). After receiving the de-allocation request, the coordinator transmits an ACK (S290) and may stop further allocation of the transmission band.

The transmission band request of step S210 may correspond to a request for allocating a transmission band transmitted from a CFP (contention free period). At this point, if the CFP is allocated with a transmission band, data may be transceived (or transmitted/received) by performing the above-described procedure. If the CFP fails to be allocated with the transmission band, the device transmits data from a CAP (Contention Access Period).

Figure 8:
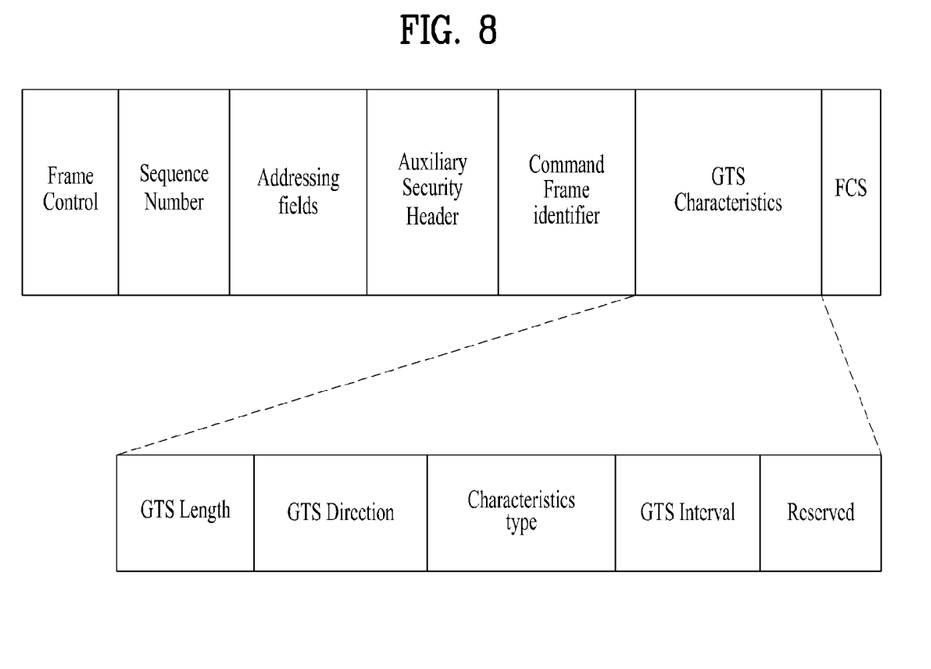
FIG. 8 illustrates a structure of a GTS request command according to the exemplary embodiment of the present invention.

FIG. 8 illustrates a structure of a GTS request command according to the exemplary embodiment of the present invention.

The GTS request command may be used when the transmission band requested by the device to the WPAN coordinator corresponds to the GTS. As shown in FIG. 8a, the GTS request command according to the exemplary embodiment of the present invention further includes a GTS interval field in the GTS characteristics field, which is defined in the IEEE 802.15.4. The GTS interval field may include the GTS allocation interval, which is decided by the device. The device may designate the GTS allocation interval in superframe units. For example, the GTS interval field value may be set up (or determined), so that the GTS allocation can be requested 1 time per 2 superframes.

Additionally, the device may also designate the GTS allocation interval in time units. For example, the GTS interval field value may be set up (or determined), so that the GTS allocation can be requested 1 time per 10 milliseconds (ms).

The device may decide the GTS interval field value based upon the superframe length of the WPAN, which the device is currently accessing.

Figure 9:
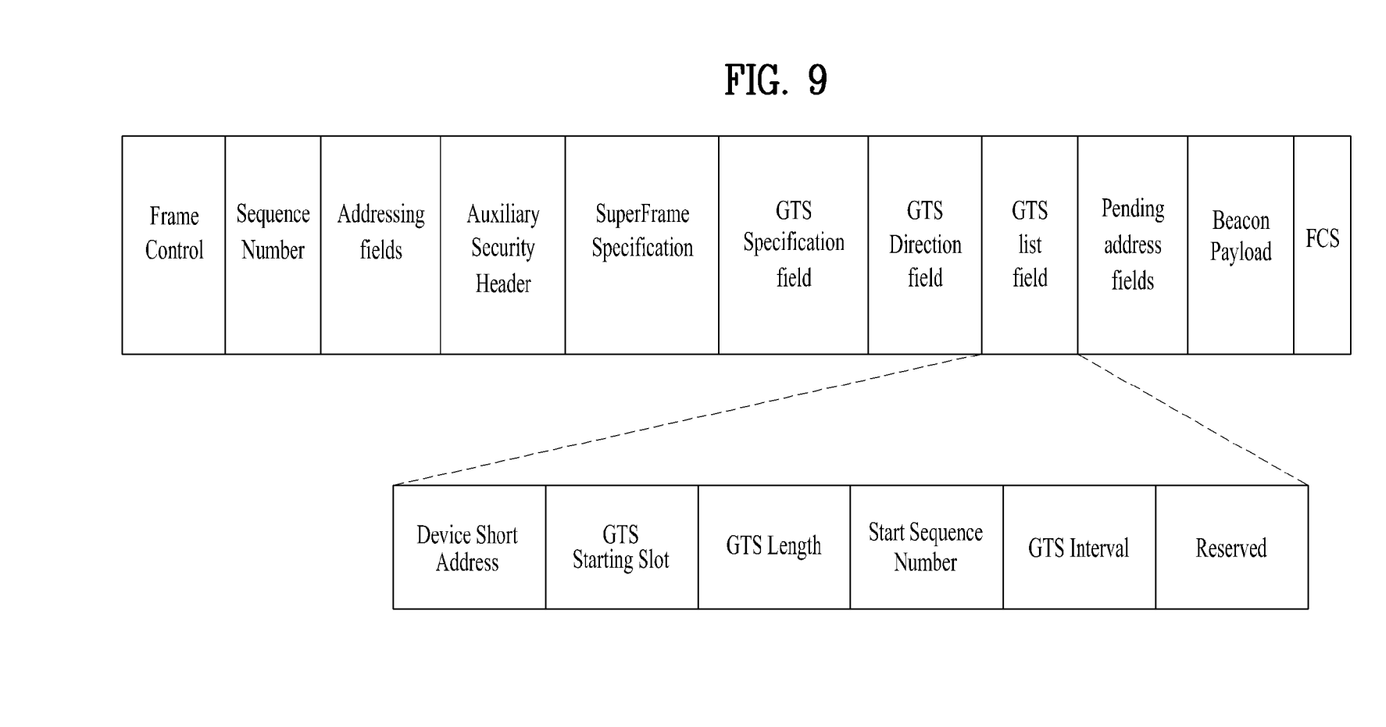
FIG. 9 illustrates a structure of a beacon frame according to the exemplary embodiment of the present invention.

FIG. 9 illustrates a structure of a beacon frame according to the exemplary embodiment of the present invention.

The beacon may be used for allowing the WPAN coordinator to transmit information related to the transmission band allocation to the device. As shown in FIG. 8, the beacon frame according to the exemplary embodiment of the present invention further includes a Start Sequence Number field and a GTS interval field in the GTS list field, which is defined in the IEEE 802.15.4. The Start Sequence Number field may include a sequence number of a super frame from which the GTS begins to be allocated to the device. The GTS interval field may include an interval of the transmission band, which is allocated to the device.

Figure 10:
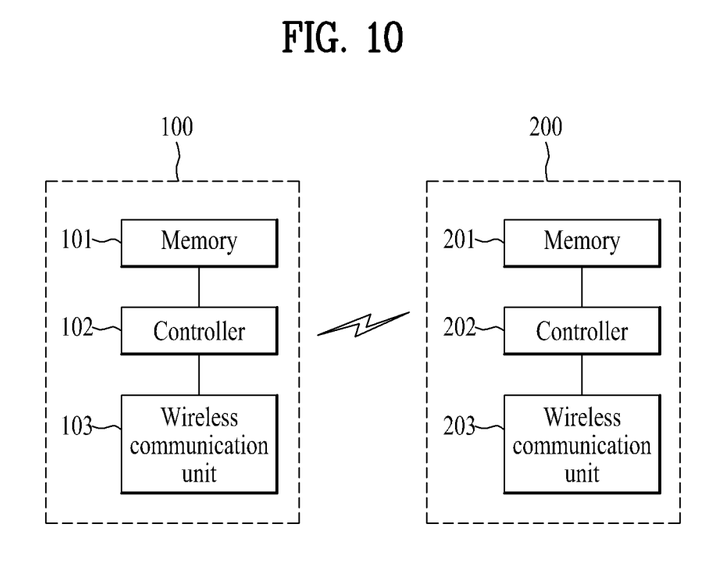
FIG. 10 illustrates a block view showing the structures of a WPAN device (or terminal) and a WPAN coordinator according to the exemplary embodiment of the present invention.

FIG. 10 illustrates a block view showing the structures of a WPAN device (or terminal) and a WPAN coordinator according to the exemplary embodiment of the present invention.

The WPAN device (100) may be configured to include a memory (101), a controller (102), and a wireless communication unit (103).

The memory (101) may store the methods proposed in the present specification (or description). Additionally, the memory (101) may store an allocation interval of the transmission band, which is decided by the controller (102). Furthermore, the memory (101) may store transmission band allocation information, which is received from the WPAN coordinator.

The controller (102) controls the overall operations of the WPAN device and also controls the memory (101) and the wireless communication unit (103). Additionally, the controller (102) may decide the allocation interval of the transmission band based upon the Characteristics information included in the device. An example of the transmission band may correspond to a Guaranteed Time Slot (GTS).

The characteristics information may correspond to information that is acquired from the data that are to be transmitted or may correspond to information that is acquired from the characteristics of the device itself. For example, information on the total amount of the data that are to be transmitted, information on whether or not the data correspond to data that are to be periodically transmitted, information on the usage of the device, and so on may correspond to the characteristics information. The controller (102) may decide the allocation interval of the transmission band in super frame units or in predetermined time units.

The controller (102) may transmit the transmission band request including the allocation interval of the decided transmission band can be transmitted to the WPAN coordinator (200) (S210). For example, in case of requesting for the allocation of the GTS, the controller (102) transmits a GTS request command to the WPAN coordinator (200).

The transmission band request may information on a required (or necessary) transmission band and allocation interval decided by the the controller (102). Additionally, the transmission band request may be used a GTS request command defined in the IEEE 802.15.4. At this point, the controller (102) may include the allocation interval (or period) in the GTS Characteristics field within the GTS request command.

The controller (102) may receive an ACK (Acknowledgement) from the WPAN coordinator (200), thereby knowing the confirmation of the transmission band allocation. Additionally, the controller (102) may receive the information related to the allocation from the WPAN coordinator (200). The information related to the allocation of the transmission band may correspond to the allocation interval of the transmission band, which is decided by the WPAN coordinator (200), a starting point or ending point of the transmission band, and so on. The controller (102) may receive the information related to the allocation through a beacon, and the information related to the allocation may be received by being included in the GTS list field within the beacon. At this point, the GTS list field may further include a Start Sequence Number field and a GTS interval field, and the Start Sequence Number field may include a sequence number of a super frame from which the transmission band begins to be allocated to the device, and the GTS interval field may include an interval of the transmission band, which is allocated to the device.

The controller (102) may perform operations, so that data can be transceived (or transmitted/received) through the transmission band, which is allocated by the coordinator.

In case the data transception (or transmission/reception) is completed, the controller (102) may transmit the transmission band de-allocation request.

The controller (102) may transmit a transmission band request, which requests the CFP (contention free period) to allocated the transmission band. At this point, if the transmission band is allocated from the CFP, data is transceived (or transmitted/received) by performing the procedure described above in FIG. 7, If the transmission band fails to be allocated from the CFP, the controller (102) performs control operations, so that the data can be transmitted from the CAP (Contention Access Period).

The wireless communication unit (103) may use the transmission band, which is decided based upon the control of the controller (102), so as to be capable of transceiving (or transmitting/receiving) data to and from the WPAN coordinator.

The WPAN coordinator (200) may be configured to include a memory (201), a controller (202), and a wireless communication unit (203).

The memory (201) may store the methods proposed in the present specification (or description). Additionally, based upon the control of the controller (202), the memory (201) may store transmission band allocation information respective to a specific device.

The controller (202) controls the overall operations of the WPAN coordinator and also controls the memory (201) and the wireless communication unit (203). Additionally, the controller (202) may receive a transmission band request from the WPAN device.

The controller (202) may allocate a transmission band based upon an allocation interval of a transmission band, which is included in the received transmission band request. At this point, the allocation may be performed as requested by the device, or the allocation may be performed differently from what is requested by the device based upon resource situation, communication situation with other devices, and so on. Alternatively, if there is no authorization (or confirmation) to be allocated, a notification indicating that a transmission band cannot be allocated may also be transmitted.

The controller (202) may transmit the information related to the allocation to the device. At this point, the information may be transmitted by being included in the GTS list field of the beacon. At this point, the GTS list field may further include a Start Sequence Number field and a GTS interval field, and the Start Sequence Number field may include a sequence number of a super frame from which the transmission band begins to be allocated to the device, and the GTS interval field may include an interval of the transmission band, which is allocated to the device.

The wireless communication unit (203) may perform communication with a specific WPAN device through a specific transmission band in accordance with the control of the controller (202). Additionally, the wireless communication unit (203) may transmit the beacon and command frames to a physical channel in accordance with the control of the controller (202).

The diverse exemplary embodiments of the present invention that have been described above may be realized (or embodied) in a recording medium, which may be read by a computer or a similar device, by using, for example, software, hardware or a combination of the two.

In the description presented above, although the preferred embodiments of the present invention have been described as examples, the scope of the present invention will not be limited only to such specific exemplary embodiments of the present invention, the present invention may be amended (or corrected), varied, or enhanced to diverse forms without deviating from the scope and spirit of the present invention.

What is claimed is:

1. A method of a device for being allocated with a transmission band in a WPAN (Wireless Personal Area Network) system, the method comprising:
   deciding an allocation interval of the transmission band based upon characteristics information included in a device;
   transmitting a transmission band request to a WPAN coordinator, the transmission band request including a transmission band allocation interval decided by the device; and
   receiving information related to the transmission band allocation from the WPAN coordinator,
   wherein the transmission band allocation is decided based upon a transmission band allocation interval decided by the device,
   wherein the information related to the transmission band allocation is received by being included in a GTS (guaranteed time slot) list field within a beacon transmitted by the WPAN coordinator,
   wherein the GTS list field further includes a Start Sequence Number field and a GTS interval field,
   wherein the Start Sequence Number field includes a sequence number of a super frame, from which a transmission band starts to be allocated to the device, and
   wherein the GTS interval field includes an interval of a transmission band allocated to the device.

2. The method of claim 1, wherein the transmission band request requests for a transmission band to be allocated from a CFP (contention free period).

3. The method of claim 2, further comprising, if the transmission band is not allocated from the CFP, transmitting data from a CAP (Contention Access Period).

4. The method of claim 1, wherein the characteristics information corresponds to:
   information acquired from data that are to be transmitted; or
   information acquired from characteristics of the device itself.

5. The method of claim 1, wherein the transmission band corresponds to a GTS.

6. The method of claim 1, wherein the allocation interval of the transmission band decided by the device is decided in super frame units.

7. The method of claim 1, wherein the allocation interval of the transmission band decided by the device is decided in time units.

8. The method of claim 1, wherein the allocation interval of the transmission band decided by the device is transmitted by being included in a GTS characteristic field within the transmission band request.

9. The method of claim 8, wherein;
   the GTS characteristic field further includes a GTS interval field; and
   the GTS interval field includes an allocation interval of the transmission band decided by the device.

10. A device of a WPAN (Wireless Personal Area Network) system, comprising:
    a wireless communication unit configured to transmit and receive data;
    a controller configured to:
      control the wireless communication unit;
      decide an allocation interval of the transmission band based upon characteristics information included in the device;
      control the wireless communication unit to transmit a transmission band request to a WPAN coordinator, the transmission band request including a transmission band allocation interval decided by the device; and
      control the wireless communication unit to receive an information related to the transmission band allocation from the WPAN coordinator,
    wherein the transmission band allocation is decided based upon the transmission band allocation interval decided by the device,
    wherein the information related to the transmission band allocation is received by being included in a GTS (guaranteed time slot) list field within a beacon transmitted by the WPAN coordinator,
    wherein the GTS list field further includes a Start Sequence Number field and a GTS interval field,
    wherein the Start Sequence Number field includes a sequence number of a super frame, from which a transmission band starts to be allocated to the device, and
    wherein the GTS interval field includes an interval of a transmission band allocated to the device.

11. The device of claim 10, wherein the transmission band request requests for a transmission band to be allocated from a CFP (contention free period).

12. The device of claim 10, wherein the controller is further configured to control the wireless communication unit to transmit data from a CAP (Contention Access Period) when the transmission band is not allocated from the CFP.

13. The device of claim 10, wherein the characteristics information corresponds to:
    information acquired from data that are to be transmitted; or
    information acquired from characteristics of the device itself.

14. The device of claim 10, wherein the transmission band corresponds to a GTS.

15. The device of claim 10, wherein the controller is further configured to decide the allocation interval of the transmission band in super frame units.

16. The device of claim 10, wherein the controller is further configured to designate the allocation interval of the transmission band in time units.

17. The device of claim 10, wherein the controller is further configured to control the wireless communication unit to transmit the GTS allocation interval by including the GTS allocation interval in a GTS characteristic field within a transmission band request.

18. The device of claim 17, wherein:
    the GTS characteristic field further includes a GTS interval field; and
    the GTS interval field includes an allocation interval of the transmission band decided by the device.

* * * * *